May 8, 1962 E. R. KRETZMER ET AL 3,034,077
ULTRASONIC DELAY LINES
Filed April 2, 1959
FIG. 1
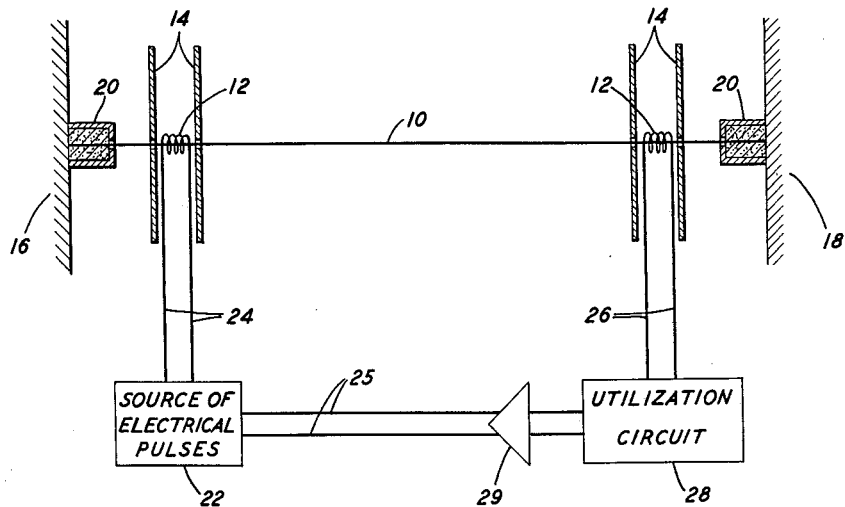
FIG. 2
FIG. 3
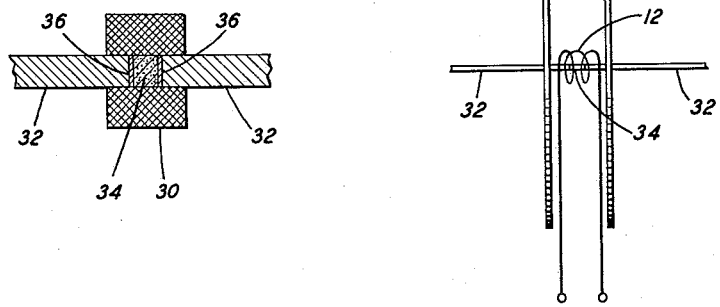
INVENTORS: *E. R. KRETZMER*
*M. A. TOWNSEND*
BY
*H. O. Wright*
ATTORNEY

3,034,077
ULTRASONIC DELAY LINES
Ernest R. Kretzmer, New Providence, and Mark A. Townsend, Summit, N.J., assignors to Bell Telephone Laboratories, Incorporated, New York, N.Y., a corporation of New York
Filed Apr. 2, 1959, Ser. No. 803,743
7 Claims. (Cl. 333—30)

This invention relates to ultrasonic delay lines. More particularly, it relates to elongated ultrasonic delay lines which, for example, may be employed to store a considerable number of energy impulses representing bits of information such as binary digits or the like.

A common form of ultrasonic delay line of the prior art, employed for the above indicated and numerous other purposes, comprises a long wire provided with electromagnetic transducers of a solenoidal type encircling the line near each end of the line, one transducer being employed to generate ultrasonic impulses in the line in response to applied electrical impulses, the other being employed to generate electrical impulses for transmission to a utilization circuit in response to ultrasonic pulses which have traveled the length of the line from the position of the first mentioned transducer. Coupling between the electrical winding of the transducer and the line is accomplished by fabricating at least a portion of the line encircled by the transducer of magnetostrictive material.

Assuming that very short electrical impulses are impressed upon the input transducer, in order that any two successive resulting ultrasonic pulses impressed upon the line should not overlap or otherwise interfere with each other, it is still necessary that the second pulse of the two be delayed for a time interval sufficient for the first pulse to travel along the line to a position such that no portion of the second ultrasonic pulse will overlap any portion of the first pulse.

Again, assuming an electrical input pulse of very short duration, the length of the delay line occupied by the resulting ultrasonic pulse obviously is determined by the physical length of the delay line to which the transducer is electromagnetically coupled. In other words, even an infinitely short electromagnetic pulse will cause an ultrasonic pulse in the delay line which will occupy a length of the ultrasonic line determined by the length of the line to which the transducer is coupled. Accordingly, the minimum time interval between pulses must be sufficient for the ultrasonic perturbation of the line resulting from a particular pulse to travel beyond the coupling length of the transducer before the next successive pulse is impressed upon the line, if overlapping of the pulses on the line is to be avoided.

A sizable transducer length necessitates a relatively slow maximum rate at which even the shortest electrical impulses may be applied to the line and, consequently, seriously limits the number of pulses which can be stored on the line per unit length of line without mutual interference between successive pulses. The receiving-end transducer imposes a similar limitation with the result that the combination permits even fewer pulses to be accommodated.

It is, therefore, a principal object of the invention to increase the number of pulses per unit length which can be placed upon an ultrasonic delay line without mutual interference between successive pulses being experienced on the delay line and at the transducers associated with the respective ends of the line.

In accordance with the invention, the length of the portions of the delay line to which the respective transducers are coupled is appreciably reduced thus reducing the length of the ultrasonic pulse and the required intervals between pulses and making possible a substantial increase in the number of pulses per unit length which can be stored on the delay line. Features of the invention include the use of magnetically permeable or of highly conductive discs immediately adjacent each side of the solenoidal coils of the transducers to constrain the magnetic field of the coil and thus to concentrate its action on a short section of the line and the use of short magnetostrictive sections in an otherwise non-magnetostrictive line to further restrict the portion of the line which may be coupled to the solenoidal coils of the transducers. Preferred materials and methods of inserting the magnetostrictive sections in the non-magnetostrictive line will also be discussed.

The above and other features, objects and advantages of the invention will become apparent from a perusal of the following detailed description of specific illustrative arrangements and from the accompanying drawings in which:

FIG. 1 represents in diagrammatic form an ultrasonic delay line as contemplated in connection with the present invention;

FIG. 2 illustrates to a greatly enlarged scale the inclusion of a short section of magnetostrictive material in a delay line of non-magnetostrictive material in accordance with a feature of the invention; and FIG. 3 represents in diagrammatic form the combined use of the arrangement of FIG. 2 and field shaping members to restrict the length of the delay line to which the transducer coil is coupled.

In more detail, in FIG. 1 an ultrasonic delay line in the form of a wire 10 is held between rigid supports 16 and 18, as shown. A rod, tube or tape could, of course, be substituted for wire 10 if desired. Adjacent each point of support at the ends of wire 10 are casings 20 enclosing a mass of damping material to absorb ultrasonic energy approaching or reflected from the point of support so that reflected energy from the supported ends of the wire 10 will be reduced to negligible amplitude and not cause interference with the other impulses being transmitted along the line. A heavy viscous grease or various compounds of rubber have been found satisfactory for damping out ultrasonic waves.

Near each end of the line the wire 10 is encircled by a solenoidal coil 12, schematically represented by a few turns, but preferably consisting of several layers of turns as indicated somewhat more realistically in FIG. 2 to be described presently. In each instance, coil 12 is made as narrow as practicable, i.e. it is fabricated so as to cover as short a section of the line as practicable, and is, for example, sandwiched between a pair of highly conductive discs 14 which are placed closely adjacent to their respective sides of the coil 12. Discs 14 can be, for example, of copper or silver and serve to contrain and thus to concentrate the electromagnetic field of the coil between them. Such discs have been found to reduce the breadth of electromagnetic coupling to the line by one third. Alternatively, the discs 14 can be made of a high resistance ferrite. Such ferrite discs have been found to reduce the breadth of coupling by one quarter but introduce somewhat less dissipation than highly conductive discs. Ferrites of the class including $Ni_3$, $Zn_7$, $Fe_2$, $O_4$ are suitable. The diameters of the pair of discs 14 preferably should exceed the diameter of the coil 12. Typically, they may be four to ten times as great. Conductive leads 24 connect coil 12 at the left end of wire 10 to a source 22 of short electrical pulses which represent, for example, "bits" of information such as binary digits or the like to be stored as ultrasonic pulses upon wire 10 for the time interval required for them to travel along wire 10 to the transducer 12 at the right end of the line. Each ultrasonic pulse upon reaching the right transducer generates an electrical pulse therein which is transmitted through leads 26 to a utilization circuit 28. A pulse regenerative circuit comprising amplifier 29 and leads 25 can, if desired, be arranged in accordance with principles widely used and well understood by those skilled in the art to keep a particular group of information bits circulating around the loop circuit as described, thus forming what is known in the art as a circulating memory device.

Wire 10 may be wholly of a magnetostrictive material, such, for example, as nickel, iron, supermandur (an alloy consisting of 49 percent cobalt, 49 percent iron and 2 percent vanadium), or any of numerous alloys of nickel and iron or various other materials well known in the art to have magnetostrictive properties.

Alternatively, the wire 10 except for a small inserted section of magnetostrictive material enclosed by each of the transducer coils 12, as illustrated in FIGS. 2 and 3, can be of substantially any non-magnetostrictive material having good ultrasonic transmission properties such as, for example, copper, tungsten, aluminum, silver or gold.

In FIG. 2, a section of a non-magnetostrictive delay line 32 with a bit of magnetostrictive material 34 inserted therein at a position encircled by a solenoidal transducer coil 30 is shown to a greatly enlarged scale. To inhibit diffusion of the magnetostrictive material 34 into the adjacent ends of non-magnetostrictive line 32 a thin plating 36 of gold is preferably applied to one of the members at each junction (provided, of course, that the line itself is not of gold) between members 32 and 34 prior to bonding them together. Other materials tending to inhibit diffusion of the magnetostrictive material, but to a lesser degree than gold, are aluminum and copper. A bonding method which does not tend to produce diffusion should be employed in bonding member 34 to the two sections of line 32. For example, they may be bonded by the thermo-compression method described in detail in the copending application Serial No. 619,637, filed October 31, 1956, by O. L. Anderson and H. Christensen, or they may be bonded by the twist-compression method described in detail in the copending application Serial No. 647,886, filed March 22, 1957, by O. L. Anderson, P. Andreatch and H. Christensen, both of which applications are assigned to applicants' assignee. The first of the above-mentioned copending applications matured as Patent No. 3,006,067 and the second as Patent No. 3,006,068. Both were granted on October 31, 1961. Soldering, welding or brazing are not suitable bonding methods since the temperatures required are sufficiently high to promote diffusion of the magnetostrictive material 34 into the adjacent sections of line 32. Appreciable diffusion of the magnetostrictive material into the adjacent sections of the line would obviously tend to increase the length of line subject to coupling with the magnetic field of the transducer coil and to thus defeat the primary purpose of restricting the length of line subject to coupling.

The arrangement of FIG. 2, fabricated with the precautions described above, restricts the action of transducer coil 30 to the small portion 34 since portions 32 are of non-magnetostrictive material and, accordingly, are not responsive to the magnetic field of coil 30. Accordingly, very short ultrasonic pulses are generated in line 32, thus permitting a decrease in the interpulse intervals and a consequent increase in the number of pulses per unit length which can be impressed upon line 32 without mutual interference between consecutively occurring pulses.

The use of highly conductive or ferrite discs 14 in conjunction with an arrangement as illustrated in FIG. 2 is shown schematically in FIG. 3. It has the further advantage of concentrating the field of coil 12 so as to couple more effectively to the bit of magnetostrictive material 34 included in line 32 as described above.

Numerous and varied other arrangements and modifications clearly within the spirit and scope of the invention will readily occur to those skilled in the art. It is to be clearly understood that the above described embodiments constitute only a limited number of specific examples selected for illustrative purposes since the principles of the invention obviously are applicable to a wide variety of other arrangements.

What is claimed is:

1. An electromechanical information storage device comprising an elongated ultrasonic delay line, electromechanical transducer means for establishing a succession of ultrasonic impulses near one end of the delay line and electromechanical transducing means near the other end of the delay line for reconverting the ultrasonic impulses to electrical impulses characterized in this that each electromagnetic transducing means comprises a narrow solenoidal winding encircling the line and mounted between a pair of highly conductive discs, the diameter of each disc being between four and ten times the diameter of the solenoidal winding, each disc being immediately adjacent the side of the winding nearer to it and further in this that the elongated ultrasonic delay line includes a section of magnetostrictive material centrally located with respect to the central transverse plane of each transducer solenoidal winding, each magnetostrictive section having an axial length with respect to the delay line which is less than half the corresponding dimension of the solenoidal winding, the remainder of the delay line being of non-magnetostrictive material.

2. An electromechanical information storage device comprising an elongated ultrasonic delay line, a pair of solenoidal windings encircling the line near the ends of the line, respectively, the line including a section of magnetostrictive material centrally located with respect to the central transverse plane of each solenoidal winding, the remainder of the line being of non-magnetostrictive material, the section of magnetostrictive material having a length smaller than half the corresponding dimension of the solenoidal winding.

3. The device of claim 2 and a highly conductive disc having a diameter between four and ten times the diameter of the solenoidal winding placed immediately adjacent each side of each winding.

4. In combination, an elongated delay line the major portion of which is of non-magnetostrictive material, the delay line including a short section of magnetostrictive material inserted between and bonded to two non-magnetostrictive portions of the line, a narrow solenoidal coil encircling the line including the short section of magnetostrictive material, the length of the magnetostrictive section being less than half the corresponding dimension of the solenoidal coil.

5. The combination of claim 4 and a field constraining disc placed closely adjacent each side of the solenoidal coil.

6. The combination of claim 5 in which the discs are of highly conductive material.

7. The combination of claim 5 in which the discs are of high resistance ferrite.

References Cited in the file of this patent

UNITED STATES PATENTS

| | | |
|---|---|---|
| 2,571,019 | Donley et al. | Oct. 9, 1951 |
| 2,619,604 | Burns | Nov. 25, 1952 |
| 2,709,243 | Babcock | May 24, 1955 |
| 2,753,529 | Maron et al. | July 3, 1956 |
| 2,797,410 | Korman et al. | June 25, 1957 |
| 2,800,633 | Roberts et al. | July 23, 1957 |
| 2,814,793 | Bonn | Nov. 26, 1957 |
| 2,846,666 | Epstein et al. | Aug. 5, 1958 |
| 2,905,909 | Niederman | Sept. 22, 1959 |